United States Patent [19]

Tanaka

[11] Patent Number: 5,679,185
[45] Date of Patent: Oct. 21, 1997

[54] PNEUMATIC TIRE

[75] Inventor: Masatoshi Tanaka, Takarazuka, Japan

[73] Assignee: Sumitomo Rubber Industries, Ltd., Hyogo-ken, Japan

[21] Appl. No.: 365,944

[22] Filed: Dec. 29, 1994

Related U.S. Application Data

[62] Division of Ser. No. 125,860, Sep. 24, 1993, Pat. No. 5,435,365.

[30] Foreign Application Priority Data

Oct. 19, 1992 [JP] Japan ................ 4-306542

[51] Int. Cl.⁶ .................. B60C 101/00; B60C 101/02
[52] U.S. Cl. ................... 152/209 R; 152/209 A
[58] Field of Search .............. 152/209 R, 209 A, 152/209 D, 454; D12/146, 147

[56] References Cited

U.S. PATENT DOCUMENTS

| | | |
|---|---|---|
| D. 336,275 | 6/1993 | Montag et al. . |
| D. 341,361 | 11/1993 | Kuramochi et al. . |
| 1,946,367 | 2/1934 | Straight . |
| 3,405,753 | 10/1968 | Verdier . |
| 3,682,220 | 8/1972 | Verdier . |
| 3,727,661 | 4/1973 | Hoke . |
| 3,893,498 | 7/1975 | Wayne . |
| 4,244,415 | 1/1981 | Peter et al. . |
| 4,284,115 | 8/1981 | Ohnishi ............... 152/209 R |
| 4,345,632 | 8/1982 | Takigawa et al. . |
| 4,617,976 | 10/1986 | Kawajiri . |
| 4,687,037 | 8/1987 | Pfeiffer et al. . |
| 5,058,643 | 10/1991 | Nakasaki . |
| 5,176,766 | 1/1993 | Landers et al. . |
| 5,222,537 | 6/1993 | Saito et al. ............ 152/209 R |
| 5,247,979 | 9/1993 | Asano ................. 152/454 |
| 5,327,952 | 7/1994 | Glover et al. ........ 152/209 R |
| 5,337,815 | 8/1994 | Graas ................. 152/209 R |

FOREIGN PATENT DOCUMENTS

| | | | |
|---|---|---|---|
| 2398625 | 7/1978 | France . | |
| 2608516 | 12/1987 | France . | |
| 0897815 | 11/1953 | Germany . | |
| 26104 | 2/1987 | Japan ........... | 152/209 R |
| 0122804 | 6/1987 | Japan . | |
| 42306 | 2/1991 | Japan ........... | 152/209 R |
| 139402 | 6/1991 | Japan ........... | 152/209 R |

OTHER PUBLICATIONS

Patent Abstracts of Japan, vol. 015, No. 354 (M–1155) 6 Sep. 1991 & JP-A-03 139 402 (abstract).

*Primary Examiner*—Steven D. Maki
*Attorney, Agent, or Firm*—Birch, Stewart, Kolasch & Birch, LLP

[57] ABSTRACT

A pneumatic tire having a tread portion with a convex profile, a pair of axially spaced bead portions, and sidewall portions extending therebetween. The tread portion is provided with a pair of circumferentially extending continuous grooves defining groove edges with a combined width of more than 16% of the ground contacting width. The tire design reduces overall tire noise, especially air resonance without deteriorating tire performance on wet surfaces.

12 Claims, 3 Drawing Sheets

PNEUMATIC TIRE

This application is a divisional of application Ser. No. 08/125,860, now U.S. Pat. No. 5,435,365 filed on Sep. 24, 1993, the entire contents of which are hereby incorporated by reference.

The present invention relates to a pneumatic tire having an improved tread portion capable of reducing tire noise without deteriorating tire performance on wet surfaces.

In recent years, improved automobile designs have reduced as the noise generated by the car mechanism and body. Thus, the percentage of the noise generated by the tire has comparatively increased correspondingly increasing demand for a low noise tire.

It is especially effective in reducing the tire noise to reduce relatively high frequency noise to which the human ears are sensitive, that is, noise whose frequency range is around 1 kHz. Air resonance noise is an example of a high frequency tire noise. The air resonance noise is explained as follows.

In the ground contacting patch of the tire, an air tube is formed between the road surface and a continuous circumferential groove in the tire tread portion. During running, the air tube is excited by air flow so that a tread deformation or movement, roughness of the road surface and the like generates a noisy sound having a specific wave length which corresponds to two times the length of the air tube. Most of the tire noise with a frequency range in the range of about 800 to 1.2 k Hz is generated by a tire having a circumferential groove is such air resonance noise, and the frequency of air resonance is almost constant independent of the running speed.

Since it has been known that air resonance can be reduced by decreasing groove volume, in order to reduce air resonance noise, conventional methods of reducing tire noise have decreased the groove volume and/or the number of circumferential grooves. As a result, decreased performance on wet surfaces such as hydroplaning, wet grip and the like have inevitably occurred.

SUMMARY OF THE INVENTION

It is therefore, an object of the present invention to provide a pneumatic tire in which, by reducing the air resonance noise, the overall tire noise is reduced without sacrificing performance on wet surfaces.

According to one aspect of the present invention, a pneumatic tire includes a tread portion with tread edges, a pair of axially spaced bead portions, and sidewall portions extending therebetween, the tread portion having a convexly curved profile having a single radius or multiple radius, the tread portion being provided with a circumferential groove extending continuously in the tire circumferential direction of the tire, defining groove edges, such that the circumferential groove having a width of more than 16% of the ground contacting width.

BRIEF DESCRIPTION OF THE DRAWINGS

Preferred embodiments of the present invention will now be described in detail in conjunction with the accompanying drawings, in which.

DETAILED DESCRIPTION OF THE PREFERRED EMBODIMENTS

Figure 1:
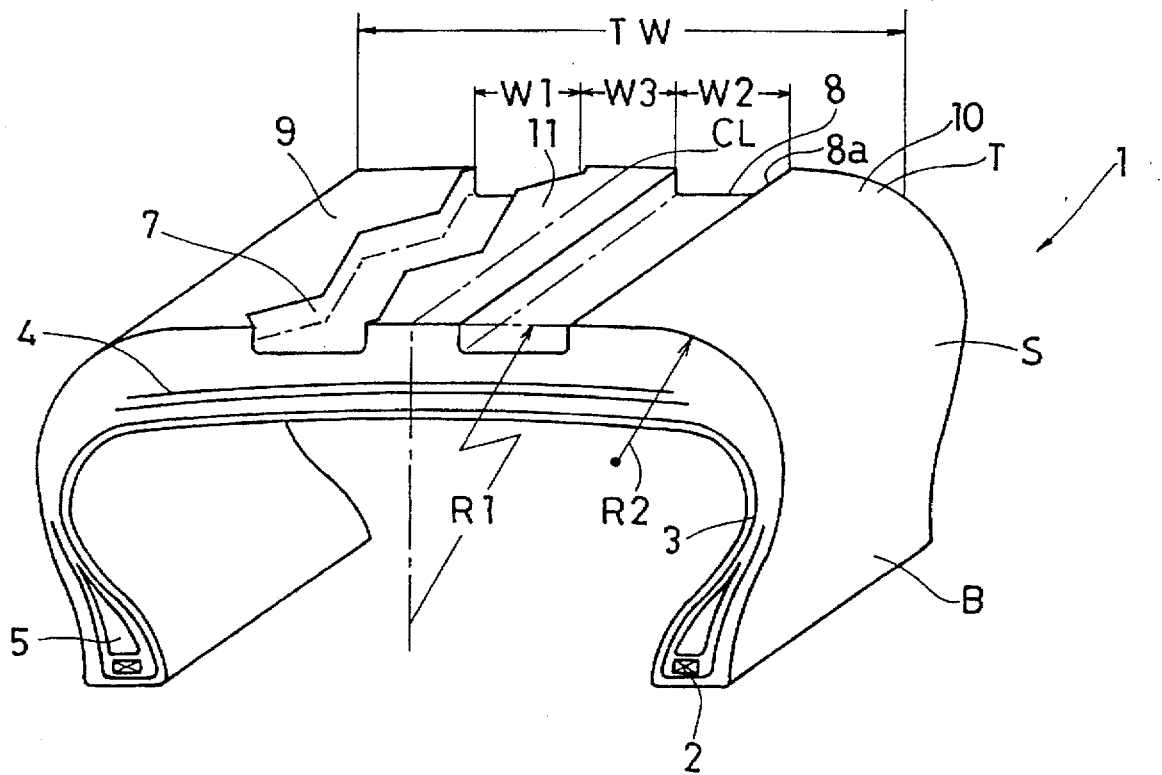
FIG. 1 is a perspective sectional view of a preferred embodiment of a pneumatic tire according to the present invention.

In FIG. 1, the tire 1 is a passenger radial tire having an aspect ratio (tire section height/tire width) of from 0.4 to 0.6.

The tire 1 includes a radial ply carcass 3 extending between bead portions B through a tread portion T and sidewall portions S, and turned up around bead cores 2 in the bead portions from axially inside to outside of the tire. A belt 4 is disposed radially outside of the carcass 3 and inside of the tread portion T and a bead apex 5 is located between the main portion and each turned up portion of the carcass and extends radially outwardly of the bead core 2.

The carcass 3 contains at least one ply of radially arranged organic fiber cords such as nylon, rayon, polyester and the like.

The belt 4 has a plurality of cross plies of high modulus cords such as steel, aromatic polyamide and the like laid at a relatively small angle of from 15 to 30 degrees with respect to the tire circumferential direction.

The tread portion T has a convexly curved profile having a single or multiple radiuses.

The tread portion T is provided with at least one circumferential groove 7, 8 extending continuously in the circumferential direction of the tire. The width W of the circumferential groove is more than 16% of the ground contacting width TW. Here, the ground contacting width TW is the axial width between the axially outermost points of the ground contacting region of the tread surface when the tire is mounted on its regular rim, inflated to its regular pressure, and loaded by its regular load. The regular rim is the rim officially recommended for the tire by, for example, TRA (USA), ETRTO (Europe), JATMA (Japan) and the like, and the regular inner pressure and the regular load are the maximum air pressure and the maximum tire load for the tire as officially specified in the Air-pressure/Maximum-load Table published by the same associations.

Figure 3:
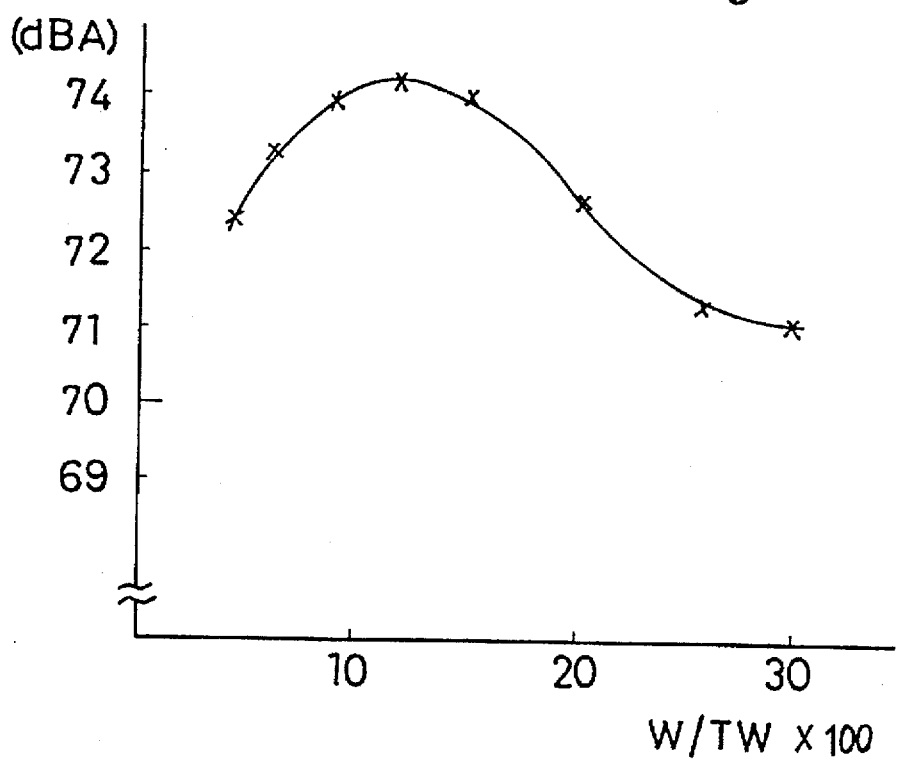
FIGS. 3 and 4 are graphs showing the results of noise tests.

FIG. 3 illustrates test results showing the tire noise level as a function of the percentage (W/WT×100) of the groove width (W) to the ground contacting width (WT). The test was made using 205/55R15 tires provided with only one circumferential groove having a U-shaped cross section. Changing the width (W) of the circumferential groove, the running noise of the test tire was measured according to a JASO test procedure. The microphone position was 7.5 meters, the running speed was 60 km/h, and the test car was a Japanese made 2000 cc passenger car.

From the test results, it was confirmed that, in the range of under a certain value, the noise level of the tire can be decreased by decreasing the groove width (W). It was discovered that a solo peak lies around 13% and in the range of over 13%, the noise level decreases with and increase in the groove width W. Further, the decreasing rate becomes appreciable from about 16%.

Figure 4:
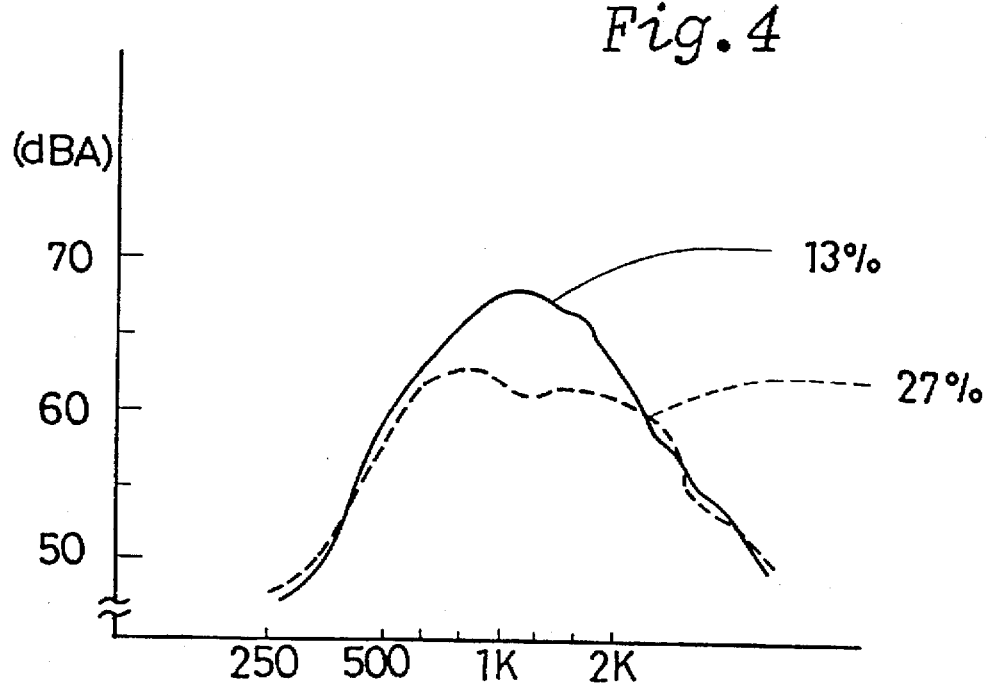

FIG. 4 shows the frequency spectrums at the peak (13%) and a higher percentage of 27%.

From this analysis, it become known that the noise of around 1 k Hz was appreciably decreased.

Thus, it was discovered that by setting the circumferential groove width over 16%, the harsh 1 k Hz noise is effectively reduced, and as a result, the overall tire noise can be effectively reduced. Therefore, as explained above, the width W of the circumferential groove is set to be more than 16% of the ground contacting width TW.

As known from FIG. 3, if the width is smaller than 8% of TW, as the air resonance is controlled, a narrow circumferential groove may be used in combination with the above-mentioned wider circumferential groove.

In other words, the tread portion is not provided with any circumferential groove having a width in the range of between 8 to 16% of the ground contacting width TW. The depth each the the circumferential grooves 7, 8 may be in the range of from 4 to 8% of the ground contacting width TW.

In the embodiment shown in FIG. 1, the tread surface T is defined by a crown part having a single radius R1 of curvature having a center on the tire equator, and a pair of shoulder parts having a single radius R2 of curvature which is smaller than the radius R1. The crown part is defined as the tire portion extending from the tire equator CL toward each side having a length of 30% of the ground contacting width TW. Each of the shoulder parts extends axially outwardly from each of the axial edges of the crown part, thereby covering 20% or more of the tread ground contacting width TW. The crown part and shoulder parts are connected without forming any inflection point.

Within the above-mentioned crown part, that is, within 60% of the width, two circumferential grooves 7 and 8 are disposed one on each side of the tire equator CL.

The widths W1 and W2 of the circumferential grooves 7 and 8, respectively, are more than 16% of the ground contacting width TW. However, one of them may be a smaller width of less than 8% as explained above. Further, the total (W1+W2) of the groove widths W1 and W2 is preferably set to be not more than 50% of the ground contacting width TW. If the total (W1+W2) is more than 50%, the dry grip, steering stability and the like are deteriorated.

Between the above-mentioned two circumferential grooves 7 and 8, a circumferentially extending continuous center rib 11 is formed on the tire equator. The width W3 of the center rib 11 is in the range of from between 5 to 15% of the ground contacting width TW. When the width W3 is less than 5%, the axial rigidity of the rib decreases which increases the noise produced by the rib. Further, the rib wears rapidly resulting in uneven wear.

On the axially outside of each of the circumferential grooves 8 and 7, circumferentially extending continuous shoulder ribs 9 and 10 are formed.

In this embodiment, further, the circumferential groove 8 is formed as a straight groove, and the other circumferential groove 7 is formed as a zigzag groove. Accordingly, the tread pattern is not symmetrical with respect to the tire equator CL.

This asymmetrical tire is mounted in a car in such a manner that the straight circumferential groove 8 is located toward the outside of the car, and the zigzag circumferential groove 7 is located toward the inside of the car.

Since the shoulder rib 10 located axially outward of the straight groove 8 is provided with a larger rigidity than the other shoulder rib 9 located axially outward of the zigzag groove 7, the deformation and movement during cornering is controlled to improve steering stability. The zigzag circumferential groove 7 improves the wet grip due to a so called wiping effect of the zigzag edges. Since the straight groove generates less noise than the zigzag groove, such arrangement helps to decrease the tire while maintaining acceptable performance.

When the groove edge has a zigzag configuration as above, a wavy configuration or the like, in order to determine the above-mentioned widths W1, W3, etc., the center line of the amplitude thereof, that is, a straight circumferential line drawn in the center between the axially outermost point and the axially innermost point of the edge is used.

Figure 2:
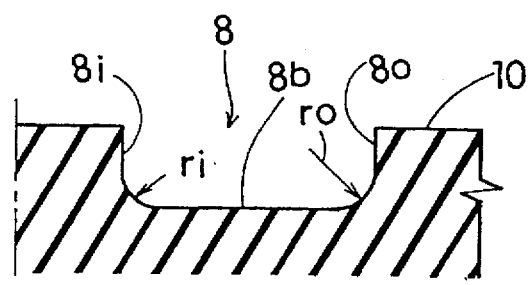
FIG. 2 is a cross sectional view of a circumferential groove of the pneumatic tire showing the section shape thereof.

The circumferential grooves 7 and 8 have a cross sectional shape as shown in FIG. 2. Groove 8 is shown as an example. The axially inner groove wall (8i) and the axially outer groove wall (8o) are perpendicular, and the groove bottom (8b) is flat. The corners therebetween are rounded. The radius (ro) of the curvature of the axially outer corner is in the range of between 1.5 to 3 times the radius (ri) of the curvature of the axially inner corner, whereby the shoulder rib 10 is increased in rigidity to improve the steering stability of the tire during cornering, and the center rib 11 is decreased in rigidity to improve ride comfort and wet grip.

Figure 5:
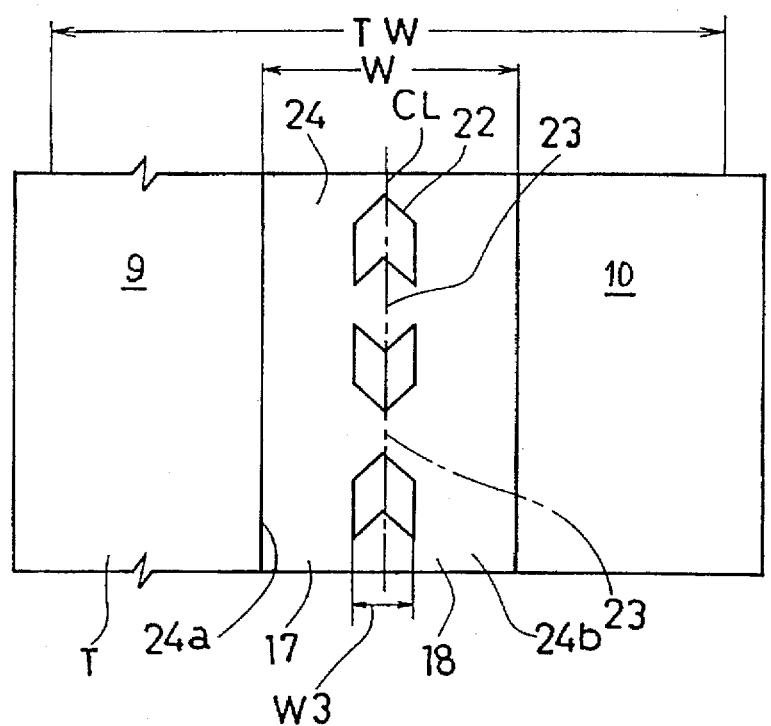
FIG. 5 is a plan view of another preferred embodiment of a pneumatic tire according to the present invention.
Figure 6:
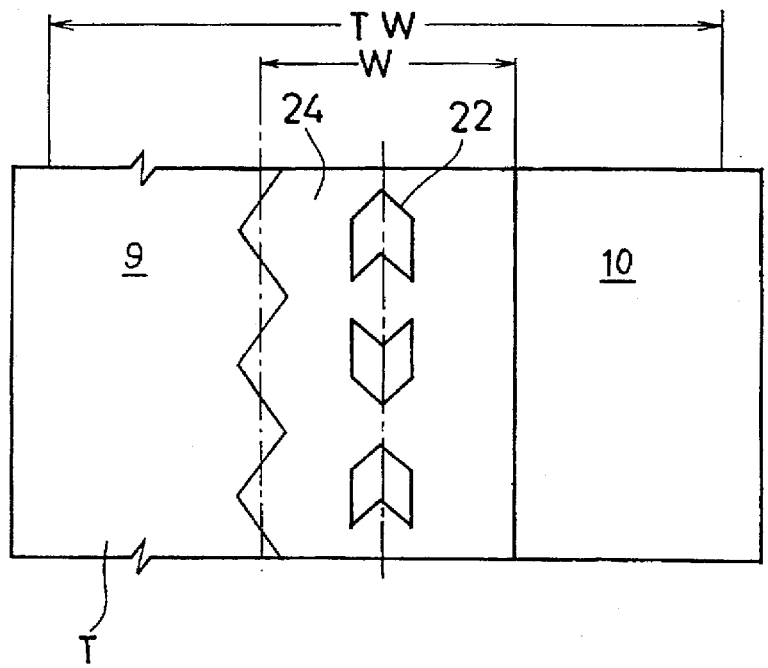
FIG. 6 is a plan view of another preferred embodiment of a pneumatic tire according to the present invention.

FIG. 5 shows another embodiment of the present invention. The above explained internal tire structure such as a carcass, belt etc., can be used here.

In the preferred second embodiment, the tread portion T is provided within the above-explained crown part (60% of the width central tread part) with a wide circumferential groove 24. The circumferential groove 24 has a width (W) of more than 25% of the ground contacting width (TW), and centered on the tire equator CL.

With such a very wide groove provided in the tread center, the groove is susceptible to deformation due to the tire load when in use. The carcass and belt are also susceptible to deformation.

In order to avoid such a deformation, the groove bottom 24b is provided with a plurality of circumferentially spaced load supporting protrusions 22. The height of each protrusion is substantially the same as the groove depth.

In the example shown in FIG. 5, the protrusions 22 are independent blocks disposed on the tire equator CL. The block has a pair of straight axial edges extending parallel with the tire equator and a pair of V-shaped befit circumferential edges extending parallel with each other, thereby having a configuration like the feathers of an arrow with respect of the direction of the arrow, the blocks are alternately arranged in the circumferential direction.

The total ground contacting area of the protrusions 22 within the groove 24 is limited to less than 20% of the total groove top area (S) of the circumferential groove 24. The total groove top area (S) is calculated by multiplying the groove width (W) by the groove length along the tire circumference. If the total ground contacting area is more than 20%, the noise generated by the air flowing between the adjacent block and between the block and the adjacent groove wall increases, and the wet performance decreases.

More preferably, the total ground contacting area of the protrusions 22 is in the range between 10 to 15% of the total groove top area (S).

Further, the width BW of the block or protrusion 22 is preferably in the range of between 5 to 15% of the ground contacting width TW.

Accordingly, the existence of the protrusions 22 within the groove prevents air resonance, and increases the overall ground contacting area so to prevent deterioration in dry grip performance, steering stability and wear performance.

The corners between the groove side walls 24a and groove bottom 24b are rounded.

By such arrangement, the wide groove 24 can be regarded as being made up of two narrow circumferentially extending groove parts 17 and 18 and axially extending groove parts 23 therebetween.

FIG. 8 shows a modification of the tread pattern shown in FIG. 5, wherein one of the groove edges is straight but the other edge to be located toward the inside of the car for the same reason as explained above, is zigzag.

In the present invention, axial grooves, sipes (cut or narrow slit) and the like can be formed in the ribs such as the center rib 11 in the first embodiment and the shoulder ribs 9 and 10 in the first and second embodiments.

It is understood that the foregoing description is the preferred embodiments of the applicant's invention. Certain modifications and or additions to the disclosed tire may be apparent to one of ordinary skill in the art without departing from the scope of the invention.

I claim:

1. A pneumatic tire comprising:
   a tread portion with tread edges, a pair of axially spaced bead portions, and sidewall portions extending therebetween,
   said tread portion including a crown part and a pair of shoulder parts which collectively have a convex profile having s single radius or multiple radius,
   said tread portion provided with two circumferential grooves divided by a center rib, each of the two circumferential grooves extending continuously in the circumferential direction of the tire and having a combined width of not more than 50% of the ground contacting width when the tire is mounted on a regular rim, inflated to a regular pressure and loaded with a regular load,
   each of the circumferential grooves has an axially outer wall and an axially inner wall disposed perpendicular to a flat groove bottom,
   the axially outer wall and the axially inner wall connecting to the groove bottom at rounded corners,
   the rounded corner between the axially outer wall and the groove bottom having a radius of 1.5 to 3 times the radius of the rounded corner between the axially inner wall and the groove bottom.

2. The pneumatic tire according to claim 1, wherein the width of the center rib is in the range of from 5 to 15% of the ground contacting width.

3. The pneumatic tire according to claim 2, wherein one of said circumferential grooves is a zigzag shaped groove.

4. The pneumatic tire according to claim 1, wherein one of said circumferential grooves is a straight groove.

5. The pneumatic tire according to claim 1, wherein one of the two circumferential grooves is a straight groove, and the other circumferential groove is a zigzag groove.

6. The pneumatic tire according to claim 1, wherein the depth of each of the circumferential grooves is in the range of 4% to 8% of the ground contacting width.

7. The pneumatic tire according to claim 1, wherein the width of one of the circumferential grooves is more than 16% of the ground contacting width.

8. The pneumatic tire according to claim 1, wherein one of the circumferential grooves is of a width less than 8% of the ground contacting width.

9. The pneumatic tire according to claim 1, wherein the center rib extends continuously in the circumferential direction of the tire.

10. The pneumatic tire according to claim 9, further comprising a center rib between the two circumferential grooves having a width in the range of 5 to 15% of the ground contacting width, wherein the center rib extends continuously in the circumferential direction of the tire.

11. The pneumatic tire according to claim 10, wherein one of the two circumferential grooves is a straight groove, and the other circumferential groove is a zigzag groove.

12. The pneumatic tire according to claim 9, wherein one of the two circumferential grooves is a straight groove, and the other circumferential groove is a zigzag groove.

* * * * *